(12) United States Patent
Kaeding et al.

(10) Patent No.: US 7,758,337 B2
(45) Date of Patent: Jul. 20, 2010

(54) BURNER DEVICE WITH A POROUS BODY

(75) Inventors: Stefan Kaeding, Zerrenthin (DE); Jeremy Lawrence, Dresden (DE)

(73) Assignee: Enerday GmbH, Stockdorf (DE)

( * ) Notice: Subject to any disclaimer, the term of this patent is extended or adjusted under 35 U.S.C. 154(b) by 490 days.

(21) Appl. No.: 11/577,298

(22) PCT Filed: Oct. 11, 2005

(86) PCT No.: PCT/DE2005/001820

§ 371 (c)(1),
(2), (4) Date: Apr. 13, 2007

(87) PCT Pub. No.: WO2006/039909

PCT Pub. Date: Apr. 20, 2006

(65) Prior Publication Data

US 2008/0020336 A1    Jan. 24, 2008

(30) Foreign Application Priority Data

Oct. 13, 2004 (DE) ................ 10 2004 049 903

(51) Int. Cl.
  *F23N 5/00* (2006.01)
  *F23D 3/40* (2006.01)
(52) U.S. Cl. ............................. 431/75; 431/7
(58) Field of Classification Search .............. 431/75, 431/18, 2–12, 170, 207, 278–285
See application file for complete search history.

(56) References Cited

U.S. PATENT DOCUMENTS 3,425,675 A * 2/1969 Twine ................ 432/199
4,230,443 A * 10/1980 Berg et al. ............. 431/328
4,388,063 A * 6/1983 Craig et al. ............ 431/19

(Continued)

FOREIGN PATENT DOCUMENTS

DE      10048183 A1    5/2001

(Continued)

OTHER PUBLICATIONS

Wikipedia: "Porenbrenner" (http://de.wikipedia.org//wiki/porenbrenner); English translation attached.

*Primary Examiner*—Kenneth B Rinehart
*Assistant Examiner*—Frances Kamps
(74) *Attorney, Agent, or Firm*—David S. Safran; Roberts Mlotkowski Safran & Cole, P.C.

(57) ABSTRACT

A burner device having a burner chamber (26) filled at least partially by a porous body (28), an evaporation zone (12) upstream of the burner chamber (26) for evaporating liquid fuel supplied via a fuel inlet line (16), an igniter (30) for igniting a combustion mixture of evaporated liquid fuel and combustion air supplied via a combustion air inlet line (18) to the evaporation zone (12) as well as an exhaust discharge (38) downstream of the combustion chamber (26). A mixing zone (20) is disposed between the evaporation zone (14) and the combustion chamber (26) in which fuel gas is introduced via a fuel gas inlet line (22, 24) and is mixed with the combustion air and/or the combustion mixture. The burner device can be used as an afterburner in a fuel cell stack.

20 Claims, 1 Drawing Sheet

U.S. PATENT DOCUMENTS

| | | | | |
|---|---|---|---|---|
| 4,421,476 | A * | 12/1983 | Gulden et al. | 431/243 |
| 4,784,599 | A * | 11/1988 | Garbo | 431/7 |
| 4,800,862 | A * | 1/1989 | McKay et al. | 123/531 |
| 4,900,245 | A * | 2/1990 | Ahmady | 431/328 |
| 4,943,493 | A * | 7/1990 | Vartanian | 429/17 |
| 5,165,884 | A * | 11/1992 | Martin et al. | 431/7 |
| 5,482,009 | A | 1/1996 | Kobayashi et al. | |
| 5,624,252 | A * | 4/1997 | Charles et al. | 431/7 |
| 5,932,293 | A * | 8/1999 | Belashchenko et al. | 427/446 |
| 5,938,427 | A * | 8/1999 | Suzuki et al. | 431/208 |
| 5,938,429 | A | 8/1999 | Brenner | |
| 6,162,046 | A * | 12/2000 | Young et al. | 431/11 |
| 6,257,868 | B1 * | 7/2001 | Durst et al. | 431/7 |
| 6,336,598 | B1 * | 1/2002 | Touchette et al. | 239/408 |
| 6,446,426 | B1 * | 9/2002 | Sweeney et al. | 60/39.81 |
| 6,932,594 | B2 * | 8/2005 | Weclas et al. | 431/7 |
| 7,122,269 | B1 * | 10/2006 | Wurzburger | 429/46 |
| 7,157,066 | B2 * | 1/2007 | Diener et al. | 423/445 B |
| 2003/0157002 | A1 * | 8/2003 | Andel et al. | 422/198 |
| 2004/0170936 | A1 * | 9/2004 | Weclas et al. | 431/7 |
| 2005/0019623 | A1 * | 1/2005 | Shoji et al. | 429/17 |
| 2005/0053816 | A1 | 3/2005 | Bhargava et al. | |

FOREIGN PATENT DOCUMENTS

| | | |
|---|---|---|
| DE | 199 60 093 A1 | 7/2001 |
| DE | 19960093 A1 | 7/2001 |
| DE | 10118148 A1 | 11/2001 |
| DE | 101 49 014 A1 | 4/2003 |
| DE | 101 60 837 A1 | 7/2003 |
| DE | 103 50 039 A1 | 5/2005 |
| WO | 2004/046613 A2 | 6/2004 |

* cited by examiner

BURNER DEVICE WITH A POROUS BODY

BACKGROUND OF THE INVENTION

1. Field of the Invention

The invention relates to a burner device comprising a burner chamber filled at least partially by a porous body, an evaporation zone upstream of the burner chamber for evaporating liquid fuel supplied via a fuel inlet line, an igniter for igniting a combustion mixture of evaporated liquid fuel and combustion air supplied via a combustion air inlet line to the evaporation zone as well as an exhaust discharge downstream of the combustion chamber.

2. Description of Related Art

One such burner device, also termed a porous burner, is known from German Patent Application DE 101 60 837 A1. Typical of a porous burner is its porous body, i.e., a body of porous material which at least partially fills the burner chamber. The porous material of such a porous body is especially a non-oxidizing material, such as SiC, SiN, or also high-temperature oxides, such as, for example, $Al_2O_3$ or $ZrO_2$. Porous bodies are often employed to improve the emission quality of a burner device. Since a defined combustion over a large surface area is involved in the porous body, making use of a porous body achieves a stable total combustion so that the burner can work at lower temperatures which, in turn, reduces the $No_x$ concentration in the exhaust gas. In addition, portions of the porous body, as disclosed for instance in the aforementioned patent application, are used as a flame trap to prevent flashback to the inlet lines or into the evaporation zone. This is achieved in that a very small pore size is provided in the portion of the porous body facing the inlet line or evaporation zone so that no flame can form there. Adjoining this small pore zone, larger pores are provided in the porous body which make for a stable flame formation, as a result of which the aforementioned objects of a stabilized flame formation and the flame trap are achieved. However, the small pore zone of the porous body results in a considerable pressure loss. This is why, despite the flame trap, flashback may occur especially in the stationary operating points of the burner which results in higher exhaust emissions or even the burner, or parts thereof, being ruined as a result.

Also known are porous burners for the combustion of gaseous fuels or fuel gases. Indeed, most porous burners are designed as gas burners. One example of such a gas porous burner is disclosed in German Patent Application DE 199 60 093 A1. This gas porous burner comprises a pot-type porous body, the interior of the pot serving as the mixing zone into which a combustible gas is introduced via a fuel gas inlet line and is mixed with combustion air, likewise introduced into the interior of the pot. The outer portion of the pot interior also serves as a reaction zone, i.e., combustion zone, the thickness of which can be controlled by the flow and pressure of the inlet gases. Stabilizing the flame materializing in the reaction zone is done in the porous body. Such a device is very sensitive to flashback, and thus, the fuel gas inlet line of the burner needs to comprise corresponding protective devices.

Porous burners for liquid fuels, on the one hand, and porous burners for fuel gases, on the other, feature completely different structures as are typically illustrated in the aforementioned patents.

SUMMARY OF THE INVENTION

The object of the present invention is to sophisticate a generic porous body so that liquid fuels and fuel gases, optionally or in combination, can be fired.

This object is achieved by a burner device having a mixing zone disposed between a burner chamber containing a porous body and an evaporation zone located upstream of the combustion chamber, a fuel gas being introduced via a fuel gas inlet line into the mixing zone where it is mixed with combustion air and/or a combustion mixture.

Advantageous aspects and further embodiments are described in further detail below.

The burner device in accordance with the invention is based on generic prior art in that, between the evaporation zone and the combustion chamber, a mixing zone is disposed in which fuel gas introduced via a fuel gas inlet line is mixed with the combustion air and/or the combustion mixture. The gist, in this arrangement, is to generate in a first zone, namely, the evaporation zone, a preferably ignitable combustion mixture of the liquid fuel and the combustion air which, depending on the requirement, is enriched in an adjoining mixing zone with fuel gas. Thus, the enriched combustion mixture is then ignited, forming a defined and stabilized flame in the porous body. It is noted that the term "combustion air" in the scope of this description is to be understood in a broad context and not just an atmospheric air mixture, but any other kind of gas containing oxygen capable of forming an ignitable mixture by mixture with evaporated liquid fuel or with a fuel gas.

Preferably, the evaporation zone is filled at least partially by a porous evaporator element.

Considered particularly of advantage in this context is the use of a metallic foam as the porous evaporator element, although it is just as possible to use ceramic foams or porous solids for this purpose ceramic. The large surface area of the porous evaporator element enhances evaporation of the liquid fuel. Evaporation can be further supported by preheating the evaporator element or its catalytic coating. Although, it is also possible to configure the evaporation zone as an atomizer chamber, preference is given to using an evaporator element because of it being simpler to achieve technically. However, it is just as possible to supply the liquid fuel via a nozzle, i.e., without a foam filling.

In another favorable aspect of the invention, it is provided that the fuel gas inlet line is configured in the mixing zone as a tube with radial perforations in its tubular wall preferably closed off at the end. Such a tube is enveloped by the flow of the combustion mixture streaming from the evaporation zone into the mixing zone achieving a particularly good mix of the fuel gas and the combustion mixture for the enrichment thereof.

Alternatively, the fuel gas inlet line may also be configured in the mixing zone as a porous ceramic body, resulting in an even better mix of fuel gas and combustion mixture due to the larger surface area of such a ceramic body as compared to a tube with a perforated tubular wall.

The igniter for igniting the combustion mixture, as may be enriched, is located preferably in the combustion chamber, it protruding into the porous body as is particularly preferred. This ensures that ignition first occurs in the (enriched) combustion mixture having entered the porous body so that a flame is first formed in the porous body in preventing flashback without a special flame trap.

When the burner in accordance with the invention as described above is used in combined operation, the flame can serve liquid fuel combustion as a pilot flame for fuel gas combustion to also permit combustion of fuel gases which in a straight gas burner would be non-combustible. However, it is just as possible to use the burner in accordance with the invention with high-quality fuel gases or liquid fuels also in a straight mode as a gas or liquid fuel burner.

Preferably, a controller is provided for controlling the inlet stream of fuel gas, liquid fuel and combustion air, each tweaked to blend with the other. Such a controller ensures achieving permanent optimum combustion despite differing supply and quality conditions.

Since it would be highly complicated to sniff test the individual components of the combustion beforehand as to their chemical properties and to set the control parameters accordingly, tweaking is closed-loop controlled in one advantageous aspect of the invention. In other words, it is provided to control tweaking as a function of a parameter sensed by means of a sensor in the region of the exhaust discharge and/or in the combustion chamber. For this purpose, a so-called lambda sensor may serve in the region of the exhaust discharge and/or a temperature sensor in the same region or in the region of the combustion chamber. This permits monitoring the combustion itself and when the sensed parameters deviate from the preset setpoint values, blending of the individual combustion components can be adjusted to achieve optimum combustion.

Such a result-oriented, closed-loop controlled system is particularly of advantage when heavy fluctuations are anticipated in the available flow and/or quality of individual combustion components, as is the case, for example, when—in a particularly preferred embodiment of the invention—the burner in accordance with the invention is used as an afterburner in a fuel cell stack, wherein the anode exhaust stream is fed to the fuel cell stack of the burner device as fuel gas.

Fuel cells are known devices for obtaining electrical energy in which substantially hydrogenated anode gas and oxygenated cathode gas are converted into water from catalyzed production of electrical energy in a fuel cell module. Such fuel cell arrangements usually comprise a plurality of interconnected fuel cell modules. The arrangements are termed fuel cell stacks. One problem with such fuel cell stacks is the incomplete conversion of the hydrogenated anode gas. This is why the (incomplete) anode exhaust stream is often combusted in an afterburner, the resulting heat of which is drawn off by a heat exchanger and made use of. However, since the degree of catalytic conversion in the fuel cell depends on its actual operating point, the "quality" of the fuel gas supplied to the afterburner greatly fluctuates, resulting in burner failure or at least less than optimum combustion quality. This problem is now eliminated by the use of the burner device in accordance with the invention as an afterburner for a fuel cell stack.

To efficiently exploit the heat resulting from combustion, it is preferably provided that the combustion chamber is in thermal contact with a heat exchanger element.

One preferred embodiment of the invention is explained in detailed below by way of example with reference to the accompanying drawings.

BRIEF DESCRIPTION OF THE DRAWINGS

The sole FIGURE is a diagrammatic cross-sectional view of one embodiment of the fuel cell stack with a burner in accordance with the invention.

DETAILED DESCRIPTION OF THE INVENTION

Figure 1:
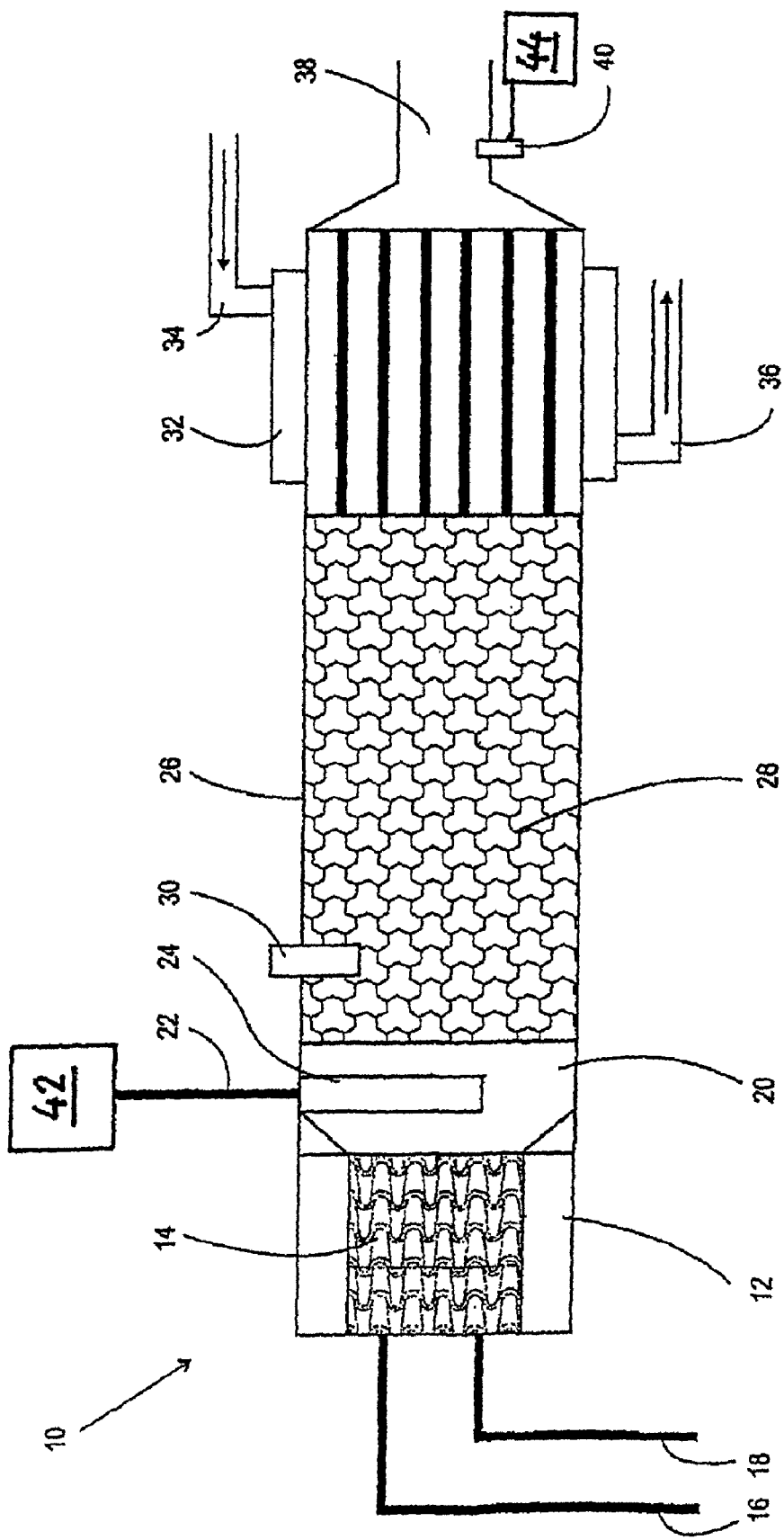

Referring now to FIG. 1, there is illustrated a fuel cell stack comprising a fuel cell module 42 to which a burner device 10 in accordance with the invention is assigned as an afterburner. Liquid fuel and combustion air are fed via a fuel inlet line 16 and a combustion air inlet line 18, respectively, into the burner device 10 which is, preferably, configured as a metallic evaporator element 14, particularly as metallic foam. Over the surface area of the evaporator element 14, which may be catalytically coated, the supply of liquid fuel evaporates and is mixed with the combustion air.

From the evaporation zone, the resulting combustion mixture flows into a mixture zone 20 into which fuel gas is introduced via a fuel gas inlet line 22 which, in this case, is the anode exhaust of the fuel cell module 42. In the mixture zone 20, the fuel gas inlet line 22 preferably has the form of a perforated tube or of a porous body, particularly, a porous ceramic body. This end portion of the fuel gas inlet line 22 is termed a fuel gas distributor 24 in the following. The fuel gas distributor 24 is enveloped in the stream of the combustion mixture from the evaporation zone, resulting in an homogenous blend of fuel gas and combustion mixture, in other words, an enrichment of the combustion mixture. The (enriched) combustion mixture then flows into the combustion chamber 26 which, in the embodiment as shown, is completely filled by a porous body 28. Protruding into the porous body 28, is an igniter 30 which may be configured as an electrical glow pin, for example. The igniter 30 ignites the (enriched) combustion mixture that has entered the porous body 28, resulting in the formation of a stabilized flame and near total combustion of the combustion mixture. In the rear portion of the combustion chamber, a heat exchanger 32 is arranged, comprising, for example, a spiral tube with connections for a fluid heat exchange medium inlet line 34 and a fluid heat exchange medium outlet line 36. The heat exchange medium fluids as used, in this case, may be any of the known fluids, such as water, glycol, thermal oils, etc, whereby, if necessary, gaseous substances, such as air, may serve as the heat transfer medium.

Connected to the rear portion of the combustion chamber 26 is an exhaust discharge 38 through which the exhaust gases of the combustion are discharged to the exterior.

In the embodiment as shown, a lambda sensor 40 is provided in the region of the exhaust discharge and with the aid of which the combustion quality can be determined by sensing certain exhaust parameters. The parameters sensed by the lambda sensor 40 can be fed into a controller 44 which adjusts blending of the liquid fuel, combustion air and fuel gas combustion components to optimize combustion in the combustion chamber 26.

It is, of course, to be understood that the particular description and embodiment as shown in the drawing merely represent an illustrative embodiment of the invention which is not at all intended to be restrictive. Changes and modifications will be made by the person skilled in the art. Thus, for instance, additional or other sensors than the shown lambda sensor 40 may be used, or even no sensor at all may be used. Furthermore, the special geometrical arrangement of the individual portions of the burner is not necessarily the same as shown in FIG. 1. For cooling the exhaust gases or for preheating fuel gas, liquid fuel and/or combustion air, the exhaust gas or components thereof may be returned to envelope the corresponding inlet lines 16, 18, 22, it being just as possible also to return same to the heat exchanger to improve its efficiency.

It is understood that the features of the invention as disclosed in the above description and the drawing may be used both singly and in any combination in accordance with the invention.

What is claimed is:

1. A burner device comprising:
an evaporation zone upstream of a combustion chamber for evaporating liquid fuel supplied via a fuel inlet line;

an igniter for igniting a combustion mixture of evaporated liquid fuel and combustion air supplied via a combustion air inlet line to the evaporation zone;

an exhaust discharge downstream of the combustion chamber;

a mixing zone provided between the evaporation zone and the combustion chamber, and in which a fuel gas supplied to the mixing zone via a fuel gas inlet line is mixable with at least one of the combustion air and the combustion mixture; and a porous body at least partially filling the combustion chamber, wherein the burner device is configured to employ a flame of a combustion of liquid fuel in a combinational operation as pilot flame for the combustion of the fuel gas, and liquid fuel and fuel gas of a combustion mixture enriched with fuel gas is combusted in the combustion chamber.

2. The burner device as set forth in claim 1, wherein the evaporation zone is filled at least partially by a porous evaporator element.

3. The burner device as set forth in claim 2, wherein the porous evaporator element is a metallic foam.

4. The burner device as set forth in claim 3, wherein the fuel gas inlet line is configured in the mixing zone as a tube with radial perforations in a tubular wall thereof.

5. The burner device as set forth in claim 3, wherein the fuel gas inlet line is configured in the mixing zone as a porous ceramic body.

6. The burner device as set forth in claim 3, wherein the igniter for igniting the combustion mixture is located protruding into the porous body in the combustion chamber.

7. The burner device as set forth in claim 6, wherein a controller is provided for adjusting the inlet stream of fuel gas, liquid fuel and combustion air which is to be blended with each other.

8. The burner device as set forth in claim 7, wherein the controller is adapted for adjusting blending as a function of a parameter sensed by means of a sensor in a region of one of the exhaust discharge and the combustion chamber.

9. The burner device as set forth in claim 8, wherein the combustion chamber is in thermal contact with a heat exchanger element.

10. The burner device as set forth in claim 2, wherein the porous evaporator element is a metallic foam.

11. The burner device as set forth in claim 1, wherein the fuel gas inlet line is configured in the mixing zone as a tube with radial perforations in a tubular wall thereof.

12. The burner device as set forth in claim 1, wherein the fuel gas inlet line is configured in the mixing zone as a porous ceramic body.

13. The burner device as set forth in claim 1, wherein the igniter for igniting the combustion mixture is located protruding into the porous body in the combustion chamber.

14. The burner device as set forth in claim 1, wherein a controller is provided for adjusting the inlet stream of fuel gas, liquid fuel and combustion air which is to be blended with each other.

15. The burner device as set forth in claim 14, wherein the controller is adapted for adjusting blending as a function of a parameter sensed by means of a sensor in a region of one of the exhaust discharge and the combustion chamber.

16. The burner device as set forth in claim 1, wherein the combustion chamber is in thermal contact with a heat exchanger element.

17. A fuel cell stack for producing electrical energy by catalytic conversion of hydrogenated anode gas and oxygenated cathode gas by at least one fuel cell module, wherein an anode exhaust stream is connected to an afterburner for further combustion, the afterburner comprising:

a burner chamber that is at least partially filled by a porous body;

an evaporation zone located upstream of the burner chamber for evaporating liquid fuel supplied thereto via a fuel inlet line;

an igniter for igniting a combustion mixture of evaporated liquid fuel and combustion air supplied via a combustion air inlet line to the evaporation zone;

an exhaust discharge downstream of the combustion chamber; and a mixing zone disposed between the evaporation zone and the combustion chamber, and in which fuel gas introduced via a fuel gas inlet line is mixed with at least one of the combustion air and the combustion mixture, wherein the burner device is configured to employ a flame of a combustion of liquid fuel in a combinational operation as pilot flame for the combustion of the fuel gas, and liquid fuel and fuel gas of a combustion mixture enriched with fuel gas is combusted in the combustion chamber.

18. The fuel cell stack as set forth in claim 17, wherein the evaporation zone is filled at least partially by a porous evaporator element.

19. The fuel cell stack as set forth in claim 17, wherein the igniter for igniting the combustion mixture is located protruding into the porous body in the combustion chamber.

20. The fuel cell stack as set forth in claim 17, wherein a controller is provided for adjusting the inlet stream of fuel gas, liquid fuel and combustion air which is to be blended with each other, and wherein the controller is adapted for adjusting blending as a function of a parameter sensed by means of a sensor in a region of one of the exhaust discharge and the combustion chamber.

* * * * *